(12) United States Patent
Galarneau et al.

(10) Patent No.: US 9,904,704 B2
(45) Date of Patent: Feb. 27, 2018

(54) SYSTEM AND METHOD FOR CONTROLLING AUDIENCE DATA AND TRACKING

(71) Applicant: OpenX Software Limited, Covent Garden (GB)

(72) Inventors: Joseph Galarneau, New York, NY (US); Ihab Rimawi, New York, NY (US); Joseph Titlebaum, Bethesda, MD (US); Kyrylo Myrnenko, Cracow (PL); Nazar Demchuk, Cracow (PL); Lukasz Milkowski, Cracow (PL)

(73) Assignee: OpenX Software Limited, Covent Garden (GB)

( * ) Notice: Subject to any disclaimer, the term of this patent is extended or adjusted under 35 U.S.C. 154(b) by 374 days.

(21) Appl. No.: 14/692,102

(22) Filed: Apr. 21, 2015

(65) Prior Publication Data
US 2015/0302052 A1    Oct. 22, 2015

Related U.S. Application Data

(60) Provisional application No. 61/982,800, filed on Apr. 22, 2014.

(51) Int. Cl.
*G06F 17/30* (2006.01)
*H04L 29/08* (2006.01)
*G06F 17/22* (2006.01)

(52) U.S. Cl.
CPC .... *G06F 17/30424* (2013.01); *G06F 17/2247* (2013.01); *H04L 67/02* (2013.01); *H04L 67/146* (2013.01)

(58) Field of Classification Search
CPC .......... G06F 17/30424; G06F 17/2247; H04L 67/02; H04L 43/08; H04L 67/146
See application file for complete search history.

(56) References Cited

U.S. PATENT DOCUMENTS

| | | | |
|---|---|---|---|
| 8,972,850 B2 | 3/2015 | Watson | |
| 9,412,115 B2 * | 8/2016 | Seolas | G06Q 30/0201 |
| 9,418,170 B2 * | 8/2016 | Seolas | G06Q 30/00 |
| 2010/0131835 A1 | 5/2010 | Kumar et al. | |
| 2011/0213840 A1 | 9/2011 | Boyer et al. | |
| 2013/0246609 A1 | 9/2013 | Topchy et al. | |
| 2014/0059219 A1 | 2/2014 | Seolas et al. | |
| 2014/0281902 A1 | 9/2014 | Feuerlein et al. | |

OTHER PUBLICATIONS

PCT International Search Report and the Written Opinion, PCT/US2015/026519, 10 pages.

* cited by examiner

*Primary Examiner* — Cheryl Lewis
(74) *Attorney, Agent, or Firm* — Patent Law Works LLP

(57) ABSTRACT

In a computing device executing a master tag embedded in a webpage, identifying a first subsequent tag in the webpage; identifying a second subsequent tag called by the first subsequent tag; identifying information collected by one or more of the first and second subsequent tag; identifying a location to which the collected information is sent; and indicating to a user the information collected and the location to which the collected information is sent. In addition, the master tag may determine a number of cookies dropped by the first subsequent tag; determine one or more characteristics of each cookie dropped by the first subsequent tag; and indicate to the user the number of cookies dropped and the one or more characteristics of each cookie dropped.

20 Claims, 7 Drawing Sheets

SYSTEM AND METHOD FOR CONTROLLING AUDIENCE DATA AND TRACKING

This patent application claims priority to U.S. Provisional Patent Application Ser. No. 61/982,800, filed Apr. 22, 2014 and incorporated herein by reference in its entirety.

TECHNICAL FIELD

The present disclosure relates to data management in web browsers.

BACKGROUND

As the Internet and Internet commerce have expanded, various website owners have sought to track a variety of data about individuals who visit their websites. In particular, website owners often wish to gather a variety of different analytic data about the visitors who view their webpage. In many cases, this analytic data can be used to determine what advertisements to display to a visitor and to determine what fees are due to be paid to various external advertisers.

One conventional method for generating analytic data on website visitors is through the use of tags. In at least one conventional form, a tag is a hidden element within a webpage that causes some action to occur on a webpage when it is "fired." In particular, in at least one implementation, a tag is a piece of code, e.g., JavaScript, that is placed within a webpage and allows a webpage owner to track information about the visitors who download and execute the particular piece of code. For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor. Tags can be provided by first parties (i.e., the operator of the website), but often are provided to the first party by third parties that offer digital services, such as ad trafficking, social networks, or analytics. The data that is transmitted to these third parties is often used in the provision of services back to the first party or is monetized directly, as in the case of data brokers.

Once executed, a tag can gather information such as where the visitor came from (e.g., what webpage or search engine), what keywords were used to find the webpage, whether a particular advertisement directed a visitor to the page, and other related data. A tag may, for example, perform operations such as:

Examine local browser data pertaining to the specific webpage user (i.e., the party interacting with the webpage), as permitted by browser configuration. Examples include content on the page, local machine OS, referring page, or clickstream data.

Examine cookies contained on the local machine, as well as setting new cookies.

Transmit data to external servers.

Modify the presentation of the current webpage or performing other webpage user interface actions, such as displaying pop-ups or pop-unders.

In many situations, a webpage can comprise multiple tags from a variety of different parties. For example, a particular webpage may contain a Google Analytics tag, a Facebook tag, a page-counter tag, a weather tag, and other common tags. The average website contains about 20 tags, and some sites may have more than 100.

In order for the analytic data gathered by tags to be complete, websites with a large number of pages may require tags on every single page. In some cases, if a page is missing a particular tag, then analytic information associated with that particular tag will not be gathered for the page. Additionally, some tags may become outdated or may be deemed a security risk. In these cases, the tags must be removed from every individual page within the website. As the number of tags and the size of websites increase, managing the tags contained within a website has become an unwieldy task.

One development to help with issues relating to the control of tags within websites has been the implementation of tag management systems. Conventional tag management systems function by replacing the plurality of individual tags on a webpage with a single master tag (in some implementations, referred to as a "container tag"). When the master tag is loaded, the tag management system identifies, using a set of rules, which of the plurality of individual tags should be allowed to run on the webpage. The tag management system can then inject the identified tags into the webpage through the master tag.

A properly implemented tag management system can provide the benefits of, among other things, only requiring a single tag to be implemented on each page of a website and providing a single interface through which all of the tags can be controlled. In practice, however, it can be difficult to implement a tag management system within a website that has previously placed tags within its pages. In particular, it can be difficult to determine what rules should be applied to each individual page within a website in order to ensure that a tag management system associates the correct tags with each individual page.

DESCRIPTION OF EXAMPLE EMBODIMENTS

Overview

In a computing device executing a master tag embedded in a webpage, a first subsequent tag in the webpage is identified. A second subsequent tag called by the first subsequent tag is also identified. Information collected by one or more of the first and second subsequent tags is identified. A location is identified, to which the collected information is sent. An indication is provided to a user of the system described herein, indicating the information collected and the location to which the collected information is sent. In addition, the master tag may determine a number of cookies dropped by the first subsequent tag; determine one or more characteristics of each cookie dropped by the first subsequent tag; and indicate the number of cookies dropped and the one or more characteristics of each cookie dropped. This processing allows for the controlling and tracking of data related to the set of parties interacting with a webpage, i.e., the audience for the webpage.

Note that the term "user" as used from this point forward refers to a user of the system described herein, e.g., the owner, manager, or administrator of a website in which embedded tags are discovered and/or analyzed.

Example Embodiments

Implementations of the present invention overcome one or more problems in the art with systems, methods and apparatus configured to use a tag management system. The tag management system incorporates a master tag into a webpage to identify other tags that are embedded within a webpage. The master tag can monitor, and in some cases control, the execution of those tags. In particular, a master tag can communicate with a server that aids in analysis of other tags within the webpage. Additionally, a master tag can aid in the preparation of data that outlines the various tags that are located within a webpage and provides characteristics about at least some of the tags.

Stated alternatively, the systems and processes described herein allow webpage owners and managers to gain both visibility into tag related transactions and control over them. The tag management system is configured to bootstrap over all other tags on the page. This gives the system described herein a measure of dominion over the operation of the embedded tags.

Figure 1:
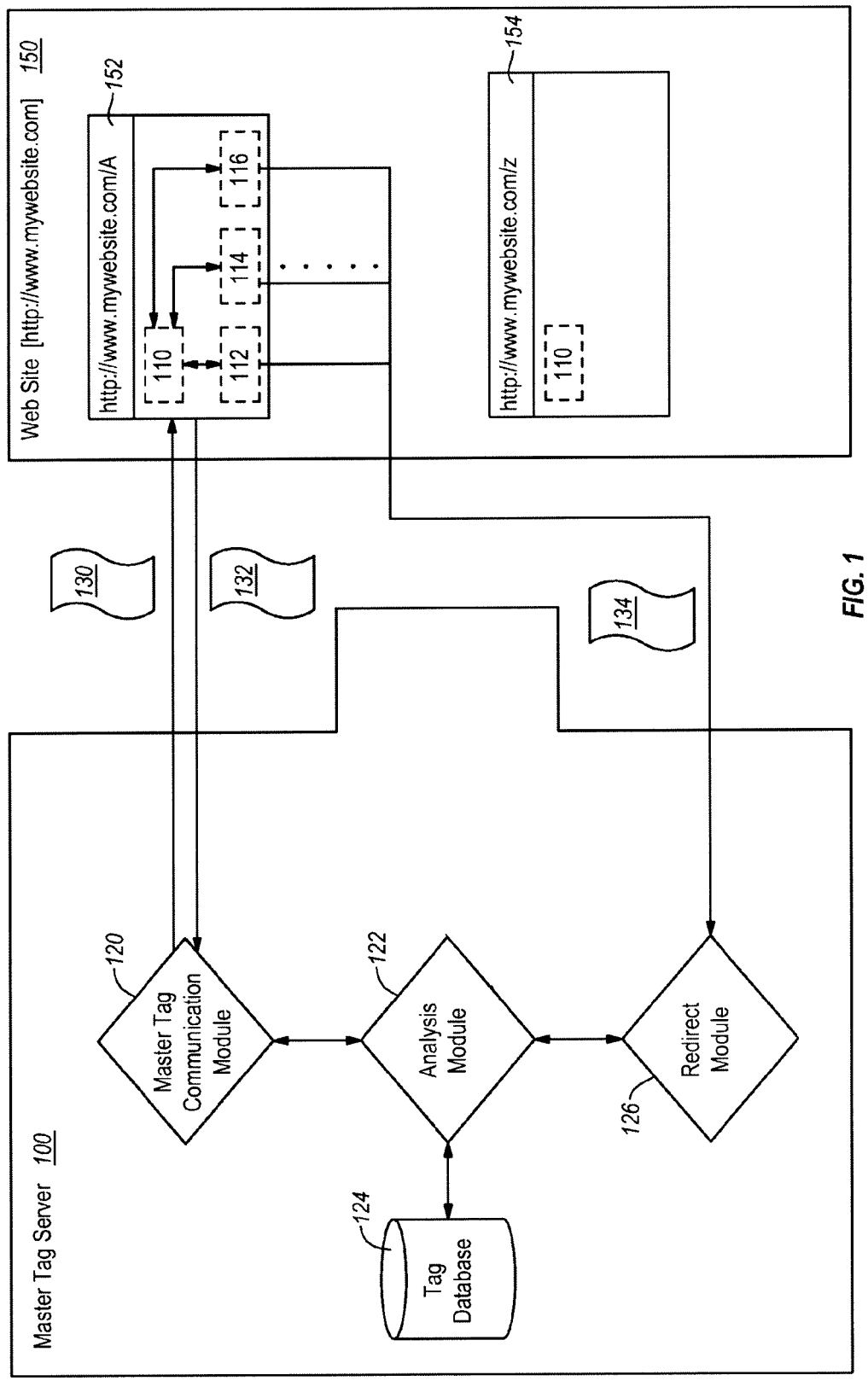
FIG. 1 is illustrates an architectural schematic diagram of a system for using a master tag to monitor and control other tags on a website, according to an embodiment.

FIG. 1 illustrates an architectural schematic diagram of a system for using a master tag to monitor and control other tags on a website. For example, FIG. 1 shows a master tag server 100 that is in communication with a website 150. In particular, the master tag server 100 can be in communication with a master tag 110 that is embedded within webpages 152 and 154 of the website 150. Additionally, in at least one implementation, the master tag server 100 can be part of a larger tag management system.

As depicted in FIG. 1, the master tag server 100 comprises a master tag communication module 120, an analysis module 122, and a tag database 124. Additionally, as depicted in FIG. 1, the website 150 comprises a plurality of webpages 152, 154. Further, at least a portion of the webpages include one or more tags 110, 112, 114, 116, of which tag 110 is a master tag 110. In at least one implementation, a master tag 110 can be embedded into one or more of the webpages 152, 154 within a website 150.

In at least one implementation, the master tag server 100 can send data 130 to and receive data 132 from each master tag 110 embedded within each respective webpage 152, 154. For example, the master tag server 100 and each respective master tag 110 can exchange data relating to analysis of the other tags 112, 114, 116 within each respective webpage 152, 154. Communications from the master tag 110 to the master tag server 100 can be used for purposes of capturing data reported by the master tag 110.

Additionally, in at least one implementation, the master tag 110 fires before any other tags 112, 114, 116. In particular, if the master tag 110 fires before the other tags 112, 114, 116 it can monitor the other tags before and while they execute.

A website's embedded tags (written in JavaScript, for example) may be analyzed by the master tag 110 and master tag server 100 as they reside and operate in the browser environment. The analysis can identify what elements in the browser environment are being examined by the tag as part of its programming, for example. The analysis may contain both the technical name of the browser data element, as well as provide a plain English description. For example, the technical element may be called XYZ, but the plain English description could be "Screen width."

In an embodiment, the processing described herein can monitor the interaction of a tag with a cookie. In particular, cookie dropping and cookie examination activities performed by any of the tags 112, 114, and 116 can be monitored by master tag 110. Master tag 110 may determine, for instance, the number of cookies dropped and the characteristics of each cookie, such as contents, expiration, size, and other characteristics of a cookie. In both instances, this information may be translated to plain English explanations for the benefit of a website owner or manager.

In an embodiment, the system described herein can also identify what interface actions a tag takes, such as displaying an ad or social widget, providing a news ticker, or playing a video. The system can also determine what data is being transmitted, and to what parties. This transmitted data may include, for example, metadata regarding the parties (e.g., whois information, the type of business the tag represents, the general purpose of tag, etc.). More generally, the operation of a tag may be controlled in an embodiment, so that a tag payload and/or its functionality may be blocked or altered, in addition to being scanned. This would allow the detection and/or control of malware and adware, for example. In an embodiment, machine learning or other methods may be used to analyze tag activity, to facilitate detecting, categorizing, and potentially blocking certain tag activities. Moreover, in an embodiment, the system described herein may substitute actions for default tag actions. For instance, if a tag transmits an IP address, the website owner or manager may be able to specify a calculated value that would instead be transmitted.

Additionally, in an embodiment, the master tag 110 only scans a webpage for other tags 112, 114, 116 at certain intervals. Specifically, the master tag 110 may only scan a webpage after a certain number of hits or on a scheduled time interval. In particular, limiting the times when the master tag 110 scans the webpage may increase the speed at which a webpage is able to render.

In at least one implementation, the master tag 110 sends data 132 to a master tag communication module 120 within the master tag server 100. Specifically, the master tag 100 can send data relating to the presence of other potential tags 112, 114, 116 on the same webpage as the master tag 110. Upon receiving the data from the master tag 110, the master tag communication module 120 can communicate the data 130 to the analysis module 122.

The analysis module 122 can then analyze the received data. In at least one implementation, the analysis module 122 identifies the tags 112, 114, 116 that are associated with each webpage 152, 154 by referencing a tag database 124 or other functionally similar mechanism or data structure. In particular, the analysis module 122 can compare the data 132 received from a master tag 110 to all of the known tags within the tag database 124. For example, the master tag 110 may send to the master tag server 100 data relating to tag 112. The analysis module 122 can compare the received data 132 to known tags that are contained within the tag database 124. The tag database 124 may contain a signature of tag 112. Using the signature for tag 112 that is stored in the tag database 180, the analysis module 160 can identify that the particular webpage contains tag 112.

In at least one implementation, the signatures within the tag database 124 may be actual copies of the known tags. In another implementation, the signatures may be based upon specific attributes of tags, such that the analysis module identifies a tag by identifying the specific attributes within a portion of the data 130 received from a master tag 110.

In at least one implementation, the tag database 124 is updated to reflect the most recent tags that are available. Additionally, in at least one implementation, custom tags can be added to the tag database 124. For example, a website owner or manager may desire to have their website analyzed according to a method described herein. The administrator, however, may be aware of a custom tag that appears on at least a webpage 152, 154 of the website 150. In at least one implementation, the administrator can provide sufficient information that the custom tag can be added to the tag database 124. Once added to the database 124, a master tag 110 and the analysis module 122 can proceed as described and identify the tags associated with the webpage of the website 152, 154, including the custom tag.

Additionally, in at least one implementation, the tag database 124 may also contain characteristics that are associated with each tag, in addition to or instead of a signature. For example, the data database may contain information about the variables, if any, that are commonly associated with specific tags. In addition, the tag database 124 may also contain information about past versions of tags, such that the analysis module 124 can identify whether a particular tag is up to date. Further, in at least one implementation, the tag database 124 may contain information that enables the analysis module 124 to identify undesirable tags (e.g., tags that are deemed malicious or otherwise unsecure, such as tags that steal private information, etc.).

In some implementations, tags associated with variables provide additional functionality than tags that are not associated with variables. For example, a tag associated with a variable may have the functionality to only fire on the first page of a particular session. Similarly, a tag associated with a variable may be able to determine whether a website visitor originated from a particular advertising campaign. In at least one implementation, the variable that a tag is associated with may comprise a browser cookie.

In an embodiment, the master tag 110 can also override functions of a tag that comes after the master tag. This may be accomplished by superseding the JavaScript or HTML commands in the downstream tag. This feature can be used to stop operation of a tag or redirect its output, for example and without limitation.

For example, in at least one implementation, the master tag 110 can manipulate the execution of the other tags 112, 114, 116 on the webpage 152. For example, the master tag 110 on webpage 152 can prevent tags 112, 114, and 116 from firing. In at least one implementation, the master tag 110 can prevent the other tags 112, 114, 116 from firing by injecting a string into the source code of the other tags 112, 114, 116. Alternatively, the master tag 110 can otherwise alter operation of an embedded tag. Additionally, in at least one implementation, the master tag 110 can delete the other tags 112, 114, 116 from the source code the webpage 152.

Further, in at least one implementation, the master tag 110 can capture or redirect the communications of another tag 112, 114, 116. Tags 112, 114, 116 may operate by communicating with a server or other device or process that is external to the website 152. The external server can use these communications to gather information about individuals who visit a particular website 150. The master tag may identify and record the information that is being communicated by the tags 112, 114, 116 to their respective external servers. In at least one implementation, when the master tag 110 monitors the communications of another tag 112, 114, 116 it may also prevent the tag from communicating with the external server.

In at least one implementation, the master tag 110 can redirect the communications of other tags 112, 114, 116 to the analysis module 122. The analysis module 122 can then analyze the received data 134 and determine various attributes of the data 134. In an embodiment, this redirection may be implemented using a proxy mechanism, as would be understood by persons or ordinary skill in the art. In at least one implementation, the tag database 124 contains information relating to the communication characteristics of a variety of different tags. The analysis module 122 can identify attributes of the received data 134 by comparing the received data 134 to the information contained in the tag database 124. For example, the analysis module 122 may identify the tag that originally sent the information, whether any personal information was sent, and what information the external server was attempting to gather.

In addition to the above recited methods of data gathering and tag control, the master tag 110 can identify "n-party" tags in an embodiment. N-party tags are tags that are called into the page by tags directly managed by the master tag 110. An example would be a tag involved in real-time bidding advertising transactions. Also, many publisher-side third party tags are just bootstrap code for larger content delivery network (CDN)-stored tags. In some situations, there may be a tag that calls in another tag that calls in another tag and so on, for several iterations. The master tag 110 may be configured to identify each of these downstream tags, their relationship to the calling tags, and perform the actions described herein on these downstream tags.

For example, the code contained in the webpage for some tags may include only limited functions that are oriented around loading other tags from remote servers. For instance, Tag A could just be a loader for Tags B . . . F, which perform the actual functions (e.g., collect data, drop cookies, etc.). The CDN may be a commercially available service like Akamai™ or Amazon CloudFront™ where digital files can be distributed to data centers around the world to speed their delivery to the end user (by being geographically closer).

Further, in an embodiment, whitelists and blacklists for n-party tags may be generated. Such tags would identify tags that always should be allowed to load on the site, as well as tags that should be blocked from loading. The whitelists and blacklists can be specified based on the originating location of a tag or the destination to which a tag is transmitting. These determinations may be made by the master tag 110 or by the analysis module 122.

In the methods recited above, a master tag 110 enables a tag management system to efficiently monitor a website 150 without requiring that every tag 112, 114, 116 within the website 150 be removed. In at least one implementation, the master tag 110 is able to selectively control the tags 112, 114, and 116 that are present within each of the webpages 152, 154 of the website 150. Additionally, at least one implementation, the system provides continual monitoring of tags 112, 114, 116 of a website 150 after a tag management system has been implemented.

Additionally, in at least one implementation, the analysis module 122 in conjunction with the master tag 110 can provide a variety of information to a website owner or manager. Such information may be presented through a graphical interface.

Figure 2:
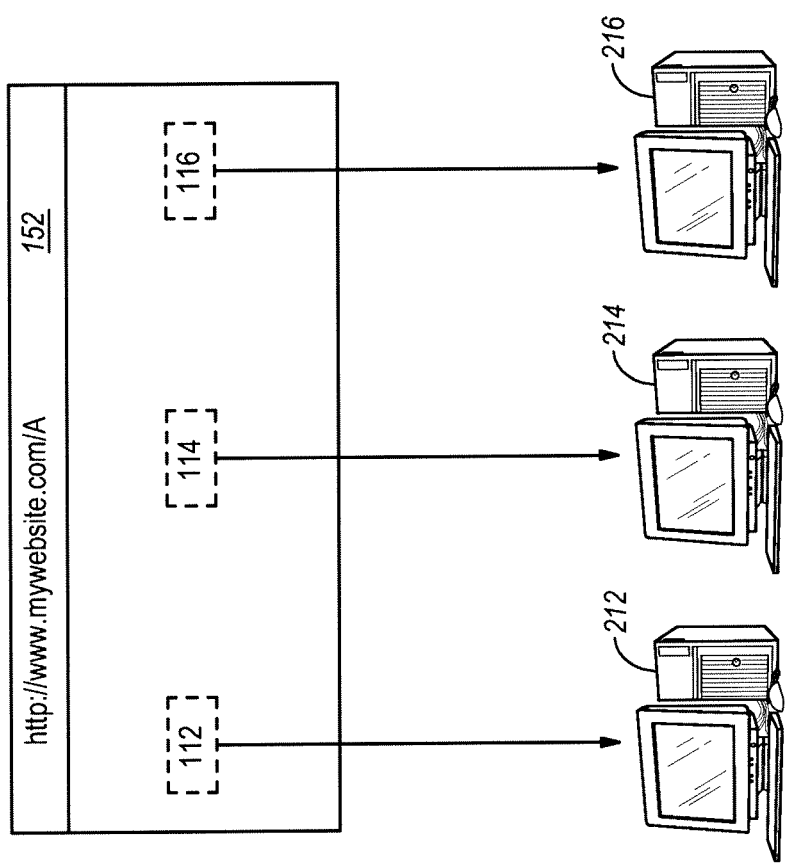
FIG. 2 is illustrates a depiction of a webpage in communication with a plurality of servers, according to an embodiment.

FIG. 2 depicts the webpage 150 of FIG. 1 in communication with a plurality of servers 212, 214, 216. In particular, tag 112 is in communication with external server 212, tag 114 in communication with external server 214, and tag 116 in communication with external server 216. As described above, each tag 112, 114, 116 on a webpage 150 may communicate with a respective external server 212, 214, 216. As the tags fire and communicate with the external servers 212, 214, 216, the external server can gather data about individuals who view a particular webpage 152.

In the implementation depicted by FIG. 2, a master tag 110 has not been embedded within the webpage 152. Additionally, a tag management system is not controlling the managing the tags 112, 114, 116. As depicted, the tags 112, 114, 116 fire when they are loaded. Additionally, the tags 112, 114, 116 communicate to their respective external servers 212, 214, 216 each time they fire.

Figure 3:
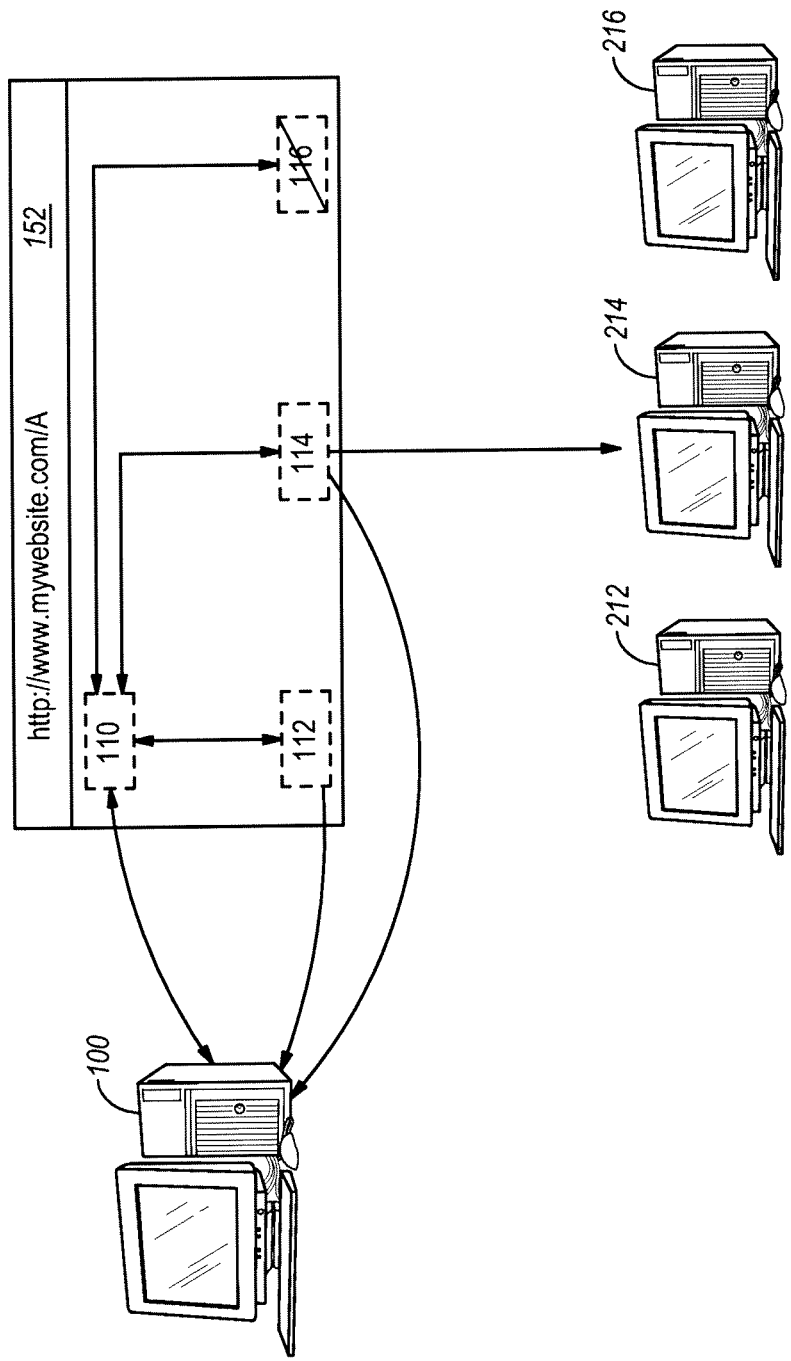
FIG. 3 illustrates another depiction of a webpage in communication with a plurality of servers, according to an embodiment.

In contrast, FIG. 3 illustrates another depiction of webpage 150 in communication with a plurality of servers 100, 212, 214, 216. In this depiction, the website 150 now includes a master tag 110, in addition to the other tags 112, 114, 116. The webpage 150 of FIG. 3 is being managed by the tag management system.

Additionally, in at least one implementation, the master tag 110 may mirror the communications from tag 114 to the master tag server 100, while allowing the tag 144 to continue to communicate with external server 214. In at least one implementation, the webpage owner or manager may desire to audit the information that is being transmitted by tag 114. For example, a webpage owner may want to know whether the tag 114 is communicating with any cookies. As the master tag server 100 gathers data, it may also generate data detailing what information is being transmitted by tag 114, for presentation to the webpage owner or manager.

Accordingly, FIGS. 1-3 and the corresponding text illustrate or otherwise describe one or more components, modules, and/or mechanisms for automatically using a master tag to monitor and control other tags on a website. In particular, in at least one implementation, the present invention can implement a tag management system on a website without requiring the removal of other tags from each webpage. Additionally, in at least one implementation, a master tag can provide continuous auditing of tags placed within the webpage of a website. One will appreciate that implementations of the present invention can also be described in terms of flowcharts comprising one or more acts for accomplishing a particular result. For example, FIGS. 4 and 5 and the corresponding text describe acts in a method for creating rules for tag management system. The acts of FIGS. 4 and 5 are described below.

Figure 4:
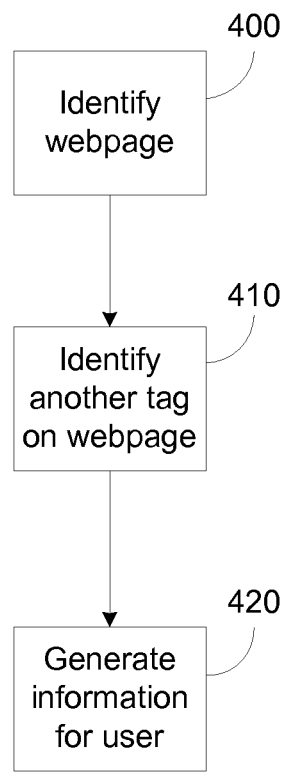
FIG. 4 illustrates a flow chart of a series of acts in a method in accordance with an implementation of the present invention for using a master tag to monitor and control other tags on a website, according to an embodiment.
Figure 5:
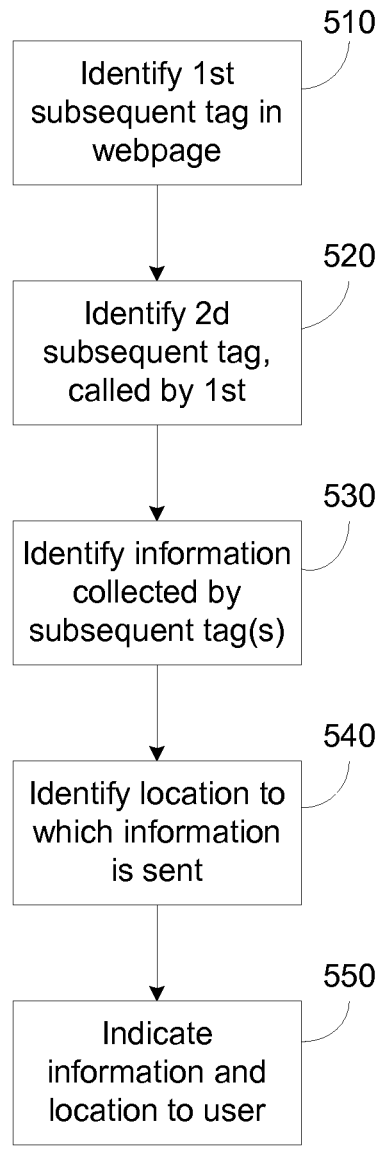
FIG. 5 is a flowchart illustrating the process of identifying n-party tags, according to an embodiment.

For example, FIG. 4 illustrates that a method for using a master tag 110 to monitor and control other tags 112, 114, 116 on a website 150 can include a process 400 for identifying a webpage. FIG. 4 also shows that the method can comprise act 410 of identifying another tag 112, 114, 116. Act 410 can include identifying, using a master tag embedded in the webpage, one or more characteristics of at least one other tag embedded within the webpage. For example, FIG. 1 shows master tag 110 identifying tags 112, 114, and 116 within webpage 150. In addition, FIG. 4 shows that the method can include act 420 of outputting data. Act 420 may include sending a report to a data store or otherwise presenting the reported information to a user, e.g., the owner or manager of the website. The information may be presented through an interface API in an embodiment. The reported data identifies one or more characteristics of the at least one other tag. This data can ultimately be provided to the owner or manager of the website.

The methods and systems described herein provide for the analysis of tags embedded in a webpage and of tags that may be called, directly or indirectly, by such embedded tags. In an embodiment, an example of such processing is illustrated in FIG. 5. At 510, a first subsequent tag is identified in a webpage by a master tag. At 520, a second tag, called by the first, is also identified. Note that in some situations, the first tag may call more than one second or subsequent tag, and that each subsequent tag may call one or more other subsequent tags. At 530, information collected by any or all of these subsequent tags is identified. At 540, the location to which this information is sent is identified. At 550, the collected information and the location are indicated to the user.

Figure 6:
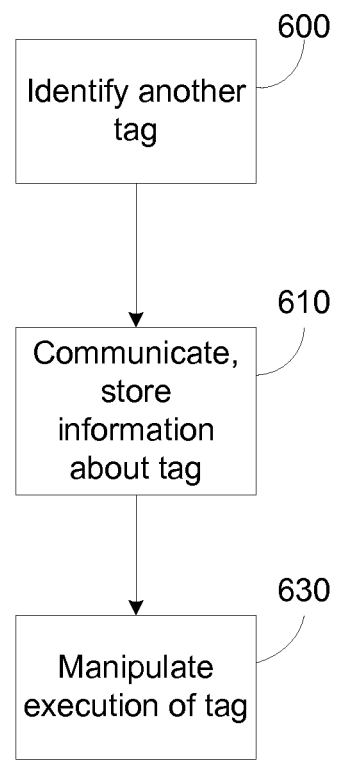
FIG. 6 illustrates another flow chart of a series of acts in a method in accordance with an implementation of the present invention for using a master tag to monitor and control other tags on a website, according to an embodiment.

FIG. 6 illustrates that a method for using a master tag to monitor and control other tags on a website can include an operation 600 of identifying another tag. Operation 600 can include identifying, using a master tag embedded within a source code of a webpage, one or more characteristics of at least one other tag within the webpage. For example, FIG. 1 shows master tag 110 identifying characteristics about tags 112, 114 and 116.

FIG. 6 also shows that the method can comprise operation 610 of communicating or storing information about a tag. In embodiments, the information regarding a tag may be communicated to and/or stored at the master tag server. Instructions for the execution of the master tag may be received from the master tag server. Alternatively, instructions from a server may not be necessary if the necessary logic is contained in the master tag in an embodiment. In the latter case, the logic in the master tag may be sufficient to manipulate the execution of the tag, as shown at operation 630. For example, FIG. 3 shows master tag 110 manipulating the execution of tags 112, 114, and 116. As described above, the master tag 110 can alter or halt the execution of an embedded tag according to an embodiment.

Figure 7:
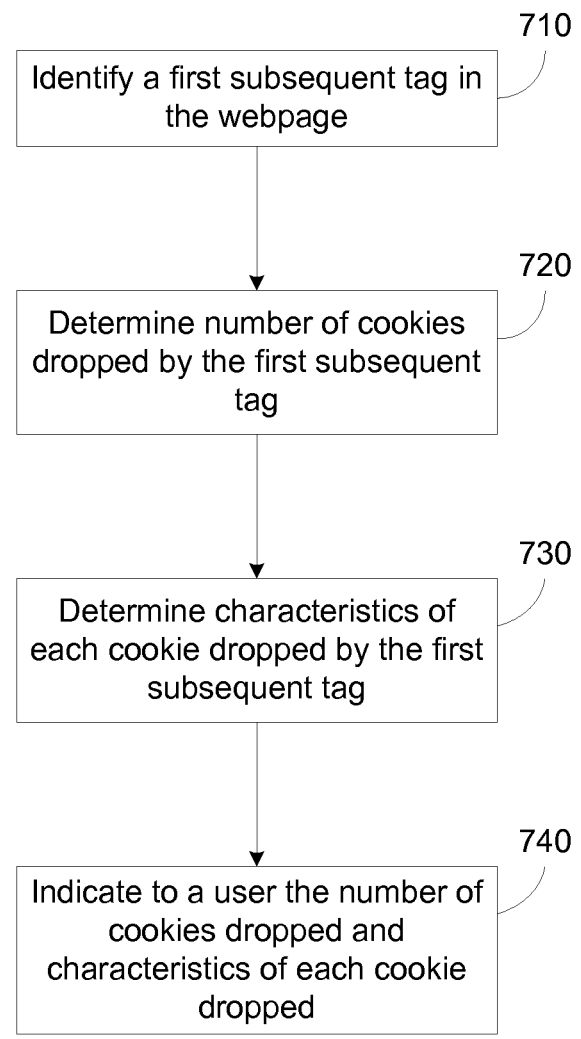
FIG. 7 is a flowchart illustrating the process of identifying cookies dropped by a tag. according to an embodiment.

As noted above, the master tag 110 may be configured to analyze a tag's behavior, with respect to dropping and/or examining cookies or with respect to other tag functions. FIG. 7 illustrates the analysis of the behavior of tags related to cookies, according to an embodiment. At 710, a first subsequent tag is identified in a webpage by a master tag. At 720, the number of cookies dropped by the first subsequent tag is determined. At 730, the characteristics of each cookie is determined. Such characteristics may include, for example, information collected by the cookie and/or a location to which the information is sent. At 740, the number of cookies and their characteristics are indicated to the user.

In an embodiment, the master tag 110 may analyze a tag's behavior by analyzing the code (e.g., JavaScript) of a tag. In an embodiment, this may be performed by controlled execution of the code within the page. But instead of simply running the tag, the system highlights the different functions, such as variables, methods, structure, etc. Alternatively or in addition, a copy of the targeted tag code may be sent to the master tag server 100 for analysis there. Analysis of a tag may be performed line by line to characterize the detailed operation of the tag.

Additionally, when examining tags of unknown purpose, the system described herein may use statistical methods to draw comparisons with other tags of known purposes to discern, in an automated manner, the tag's intended operation. In an embodiment, a functional inventory for the tag may be created, as well as the categories that best describe that tag (e.g., ad technology, affiliate marketing, etc.). Analysis may be preformed to find various code elements (functions, variables, libraries) of the tag using natural language and other text processing techniques. These code elements may be organized in an embodiment as a program component matrix. Two bodies of data points are thereby known for each known tag: the inventory and the matrix. The former may be manually generated and the latter may be automatically generated.

Matrices of every tag may then be automatically created, and the best match may be found within the universe of existing tags using statistical methods. Once that is completed, corresponding functional inventories and categories may be found, to discern the highest probability match for the function and purpose of the tag.

As part of this analysis, a tag may be scored on a number of different dimensions. Each tag may receive a normalized rating from 0 to 100 relative to every tag previously encountered on this and other websites. For example, a rating of 100 indicates a tag that performs this activity more than nearly any other tag in the database, where 0 means the opposite. In an embodiment, these dimensions may include:

Data collection: How much data does the tag collect and transmit to third party servers.

Tracking: What sorts of cookie-based, local storage, and browser entropy tracking does the tag perform with respect to a party interacting with the webpage.

User interface (UI) manipulation: What sorts of calls does the tag make to alter the UI of the webpage.

Tag chaining: How much other third party code is called in.

Security: Of the remote calls made by the tag, how many are secure (e.g., using HTTPS) versus insecure (e.g., HTTP).

Suspect activities: For a given category of tag, what are expected sorts of activities and what are deviations from those activities. This may require benchmarking of previously encountered tags based on their declared category, and determination of clusters of typical behavior in order to identify the anomalies.

A composite index may be constructed that represents a weighted sum of the above.

Such a statistical model may represent a ranking for third-party tags. Each one of these indices may be driven by previously gathered data. The score would be automatically calculated. Heuristics may be created to calculate each index, such as the frequency with which a particular JavaScript function appears in the code, plus the number of remote calls made. As more complex data is gathered, manual updates may be performed to better reflect the nature of the tag. These indices may be automatically recalculated on a daily basis across the system and may change over time for the same tag as the criteria become more elaborate. These indices would be used to signal similarity or difference of unknown tags.

Alternatively or in addition, tags may also undergo human inspection to categorize their functions, which can result in a data store that is usable to train machine learning functionality of the overall system.

In addition to the statistical model, specific information may be collected by the master tag 110 regarding properties of an embedded tag, or of an n-party tag. Examples of such information may include:
Container tag identity
Whether the tag is called
Tag level
Child tags
Crowdsource blacklist
Data elements examined
Presence of or relationship to malware
Name
Malware contents
Suspect action
Data payload
Data recipient (domain)
Data recipient (company)
Transmit data
Category
Postal code
City
State
Country
Favicon
Tag code
Type
AJAX tag
Sync/async
Vendor
Vendor description
Vendor URL
Pages mentioning tag
Average execution time
Errors
Error rate
Frequency
Frequency rank
Frequency distribution
Tag paths
Parent(s)
Max execution time
Data sharing index
Tracking index
UI index
Container index
Suspect activities index
Read cookie
Read cookie details
Use local storage
Local storage details
Suspected browser fingerprinting
Write cookie
Write cookie details
Change UI
UI items
UI preview
Geosharing
Size
Read Flash cookie
Read Flash cookie details
Write Flash cookie
Write Flash cookie details Regarding the collection and identification of information transmitted by a tag, security measures are typically used by a tag to secure such information. A tag may communicate with an external server using encryption techniques (e.g., secure sockets layer SSL). The master tag could eavesdrop on these communications (using a "man in the middle" exploit), but the encryption may prevent it from discerning the message content. Instead, the master tag may defeat this encryption by examining the contents of the message within the targeted tag before it is encrypted.

Further, as discussed earlier, the master tag 110 may be configured to identify n-party tags, i.e., tags that are called into the webpage by a tag overseen by the master tag 110. An n-party tag may employ a JavaScript (or HTML) call that would be detected by the master tag. Additionally, the master tag would examine the signature of that call to determine the likely identity of the code that would be returned. The call would direct the master tag to the next tag in the chain. Detection of the call may then be repeated to discover the next tag in the chain. This process may be continued ad infinitum, and may also by used in situations where a given tag calls multiple subsequent tags.

In various embodiments, reported data may take a variety of forms. For example, a graphical time-series analysis of tag activities may be presented, for all tags collectively or for one or more individual tags. This may include representations of when tags are loaded, when they begin and finish executing, dependencies with other tags (e.g., tags that are called), errors, and breakdowns in the aforementioned transactions. The display could permit the user to drill down or zoom out with varying levels of detail in various embodiments. Real time connectivity diagrams of tag relationships may also be presented. Such relationship diagrams may allow dynamic rearrangement. Again, these diagrams may allow zooming to reveal more detail. Generally, the underlying structure of a tag may be reported in various levels of detail. In an embodiment, the source code of tags may be presented. The medium and format in which reporting may take place may vary with different embodiments. Tag activities, for example, may be presented in printable and/or sortable formats, and may be presented via an application program interface. This data may be also exported, e.g. in CSV, PDF, and/or XLS formats, without limitation.

Generally, the information may include name/type of webpage, the date when one or more transactions (i.e., visits to the website) occurred, the type of device, browser, and operating system (OS) on which the webpage was viewed (desktop, mobile, etc), the geographic location of the user(s) viewing the page, and by "date bucket" (rolling up all transaction into a day, week, or other time unit). Moreover, the information may be presented in an interactive manner, where a user interface may be provided that graphically visualizes the tag relationships. In addition, this data can cover all visitor interactions with the website, and not just a single transaction. This is possible because the master tag executes every time the page is loaded.

A translation table may be used to map JavaScript and HTML functions into their plain English descriptions. That is, as the system decomposes tags into their constituent JavaScript functions, this translation table will turn them into non-technical descriptions. For instance, the analyzer may detect the following code:

```
function bake_cookie(name, value) {
    var cookie = [name, '=', JSON.stringify(value), '; domain=.',
    window.location.host.toString( ), ';
    path=/;'].join('');
    document.cookie = cookie;
}
```

The translation table may have an entry for this code (or a fragment of it) that says "Store cookie on user's browser." Furthermore, the "value" in the code would also be translated into the actual plain English description. One example of a value representing a location would be an amalgam of city, state and country.

Accordingly, FIGS. 1-7 provide a number of components, schematics, and mechanisms for using a master tag to monitor and control other tags on a webpage. Additionally, one or more implementations allow a tag management system to control the tags of a webpage through the master tag. One will appreciate that the components and mechanisms described herein can greatly simplify the implementation of a tag management system and the auditing of tags within a website. For example, the components and mechanisms described herein implement a tag system and continually monitor the tags within the website without requiring that other tags be removed.

Moreover, collected information about a tag may be used to formulate options for users of a webpage. For example, analysis of a tag's activities may be used as input to a privacy tool, which can then communicate options to the user, e.g., Do Not Track, Opt-In, or Opt-Out, from which the user may select. This would permit consumers, with the permission of webpage owners or managers, to observe and control what data is being gathered about their Internet activities and to set their preferences.

The collected information may also allow a webpage owner or manager to perform a variety of business analyses. The webpage owner could gain a better understanding of demographic, psychographic or other identifies of their target audience, as well as target ad rates and other metadata. The system described herein could utilize ad ecosystem APIs to data providers, ad networks and exchanges, and other companies to calculate an open-market cost of these audiences (i.e., the cost for which advertisers could access these audiences). The system described herein could then calculate the arbitrage cost of these particular segments, which could result in understanding the specific, time-dependent economic impact of data leakage for a particular customer.

In addition, metrics gathered from tag statistics, along with data regarding a user's browser regarding overall performance, e.g., page load time (broken down to the component level) and the viewability of visual elements, may be useful in determining compliance with standards established by organizations such as the Interactive Advertising Bureau and Media Rating Council.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available tangible non-transitory media that can be accessed by a general purpose or special purpose computer.

By way of example, and not limitation, such non-transitory computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The above description is intended by way of example only.

What is claimed is:

1. A method comprising:
in a computing device executing a master tag embedded in a webpage, the master tag embedded by an external server to operate in a browser environment and selectively track and execute a plurality of control and interface actions including stopping, preventing and altering tasks performed by other subsequent tags embedded in the webpage, the master tag determining a technical name for a browser data element and translating the browser data element to a non-technical description of the browser data element for a user;
identifying a first subsequent tag in the webpage;
identifying a second subsequent tag called by the first subsequent tag;
identifying information collected by one or more of the first and second subsequent tag;
identifying a location including identity of an external server to which the collected information is sent;
indicating to said user the information collected including meta data relating to the first, second or other subsequent tag and the location to which the collected information is sent; and
providing a capability to selectively block at least one action of the plurality of control and interface actions of at least one of said first subsequent tag and said second subsequent tag relating to specific tag tasks, including blocking of a tracking cookie.

2. The method of claim 1, wherein the identifying of information comprises identifying information related to a party interacting with the webpage.

3. The method of claim 1, wherein the identifying of the location comprises identifying one or more of a network address or a geographical location to which the collected information is sent.

4. The method of claim 1, wherein the indicating to the user of the information and the location comprises indicating the information and the location through a graphical interface.

5. The method of claim 1, wherein the master tag executes before execution of any other subsequent tag to track activity by any other subsequent tag before and while it executes in the web page.

6. One or more non-transitory computer readable storage media encoded with software comprising computer executable instructions wherein, when the software is executed, are operable to:

identify a first subsequent tag in a webpage;
identify a second subsequent tag called by the first subsequent tag;
identify information collected by one or more of the first and second subsequent tag;
identify a location of at least one external server to which the collected information is sent; and
indicate to a user the information collected and the location to which the collected information is sent;
wherein the executable instructions are incorporated in a master tag embedded in the webpage by an external server to operate in a browser environment to selectively track and execute a plurality of control and interface actions including stopping, preventing and altering tasks performed by other subsequent tags embedded in the webpage, including the first subsequent tag and the second subsequent tag, the master tag determining a technical name for a browser data element and translating the browser data element to a non-technical description of the browser data element for said user and providing a capability to selectively block at least one of the control and interface actions relating to tag tasks, including blocking of a tracking cookie.

7. The computer readable storage media of claim 6, wherein the executable instructions operable to identify information comprises instructions operable to identify information related to a party interacting with the webpage.

8. The computer readable storage media of claim 6, wherein the executable instructions operable to identify the location comprises instructions operable to identify one or more of a network address or a geographical location to which the collected information is sent.

9. The computer readable storage media of claim 6, wherein executable instructions operable to indicate to the user of the information and the location comprises instructions operable to indicate the information and the location through a graphical interface.

10. The computer readable storage media of claim 6, wherein the master tag executes before execution of any other subsequent tag to track activity by any other subsequent tag before and while it executes in the web page.

11. One or more tangible, non-transitory computer readable storage media encoded with software comprising computer executable instructions wherein, when the software is executed, is operable to:
identify a first subsequent tag in the webpage;
determine a number of cookies dropped by the first subsequent tag;
determine one or more characteristics of each cookie dropped by the first subsequent tag; and
indicate to a user the number of cookies dropped and the one or more characteristics of each cookie dropped;
wherein the executable instructions are incorporated in a master tag embedded in the webpage by an external server to operate in a browser environment to selectively track and execute a plurality of control and interface actions including stopping, preventing and altering tasks performed by other subsequent tags embedded in the webpage, including the first subsequent tag and the second subsequent tag, the master tag determining a technical name for a browser data element and translating the browser data element to a non-technical description of the browser data element for said user and providing a capability to selectively block at least one of the control and interface actions relating to tag tasks, including blocking of a tracking cookie.

12. The method of claim 11, wherein the characteristics of each cookie comprise one or more of contents, an expiration, or a size of each cookie.

13. The method of claim 11, wherein the master tag executes before execution of the first subsequent tag.

14. The method of claim 11, wherein the indicating to the user comprises indicating, through a graphical user interface, the number of cookies dropped and the one or more characteristics of each cookie dropped.

15. The method of claim 11, further comprising:
identifying a second subsequent tag that is called by the first subsequent tag;
determining a number of cookies dropped by the second subsequent tag;
determining one or more characteristics of each cookie dropped by the second subsequent tag; and
indicating to the user the number of cookies dropped by the second subsequent tag and the one or more characteristics of each cookie dropped by the second subsequent tag.

16. A method comprising:
in a computing device executing a master tag embedded in a webpage by an external server, to operate in a browser environment to selectively track and execute a plurality of control and interface actions including stopping, preventing and altering tasks performed by other subsequent tags embedded in the webpage, the master tag determining a technical name for a browser data element and translating the browser data element to a non-technical description of the browser data element for a user;
identifying a first subsequent tag in the webpage;
determining a number of cookies dropped by the first subsequent tag;
determining one or more characteristics of each cookie dropped by the first subsequent tag;
indicating to said user the number of cookies dropped and the one or more characteristics of each cookie dropped; and
providing a capability to selectively block at least one action of the plurality of control and interface actions of at least one of said first subsequent tag and said second subsequent tag relating to tag tasks, including blocking of a cookie.

17. The computer readable storage media of claim 16, wherein the characteristics of each cookie comprise one or more of contents, an expiration, or a size of each cookie.

18. The computer readable storage media of claim 16, wherein the executable instructions incorporated in the web page execute before the first subsequent tag.

19. The computer readable storage media of claim 16, wherein the executable instructions operable to indicate to the user the number of cookies dropped and the one or more characteristics of each cookie dropped comprise executable instructions operable to indicate, through a graphical user interface, the number of cookies dropped and the one or more characteristics of each cookie dropped.

20. The computer readable storage media of claim 16, wherein the executable instructions are further operable to:
identify a second subsequent tag that is called by the first subsequent tag;
determine a number of cookies dropped by the second subsequent tag;
determine one or more characteristics of each cookie dropped by the second subsequent tag; and
indicate to the user the number of cookies dropped by the second subsequent tag and the one or more characteristics of each cookie dropped by the second subsequent tag.

* * * * *